SMECTOGRAPHIC DISPLAY

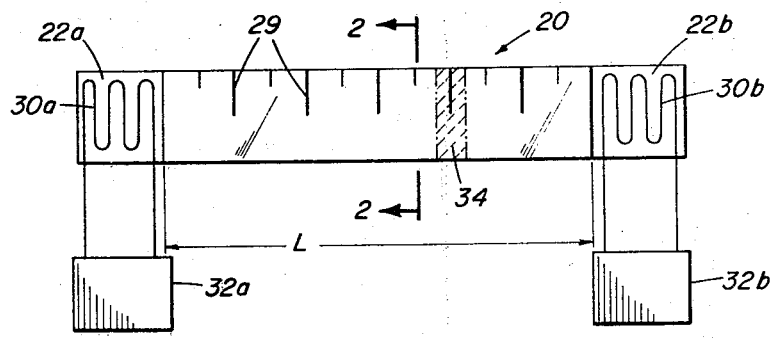
FIG.1
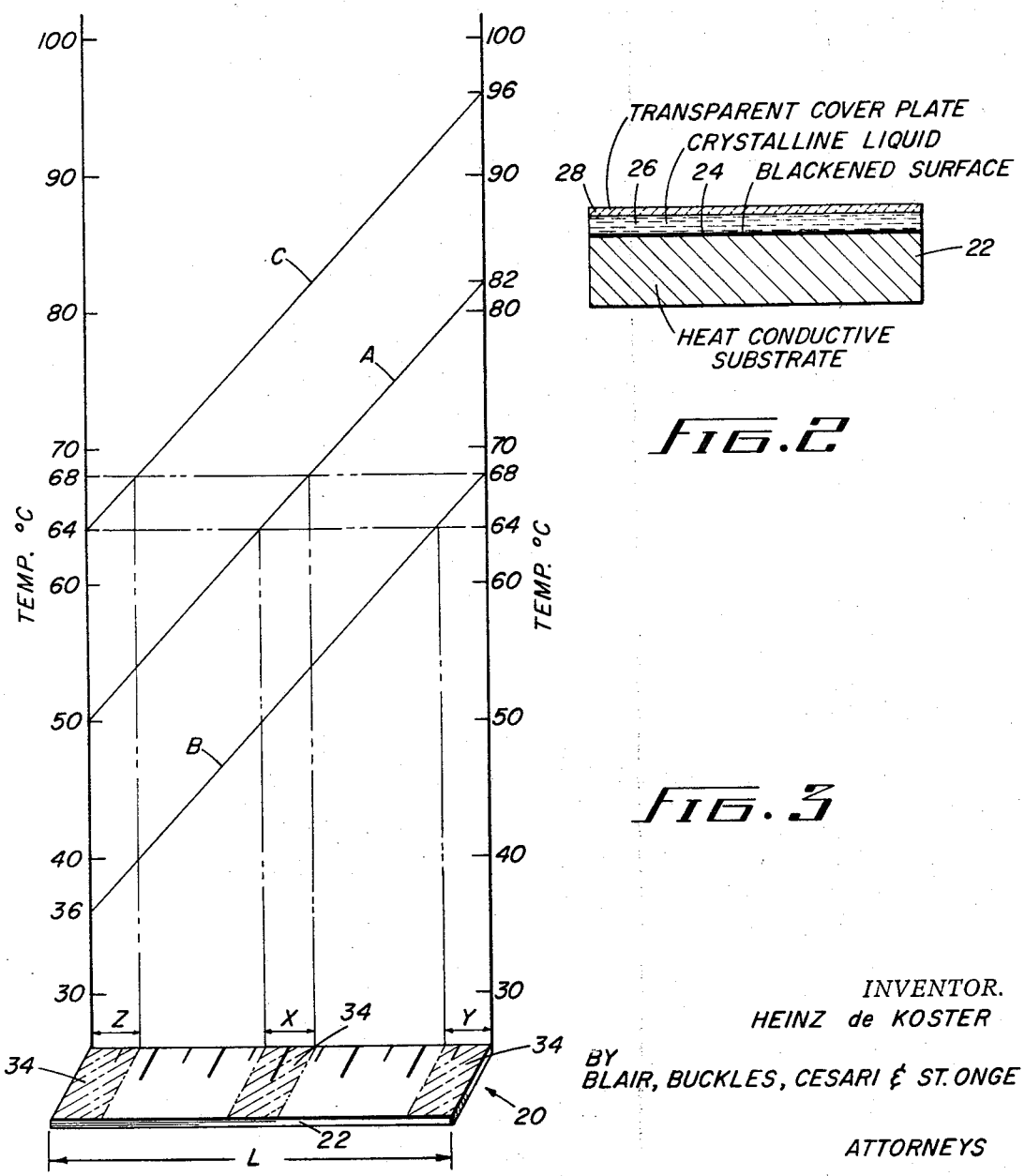
FIG.2
FIG.3
INVENTOR.
HEINZ de KOSTER
BY
BLAIR, BUCKLES, CESARI & ST. ONGE
ATTORNEYS Aug. 18, 1970     H. A. DE KOSTER     3,524,726
SMECTOGRAPHIC DISPLAY
Filed April 4, 1968     3 Sheets-Sheet 2
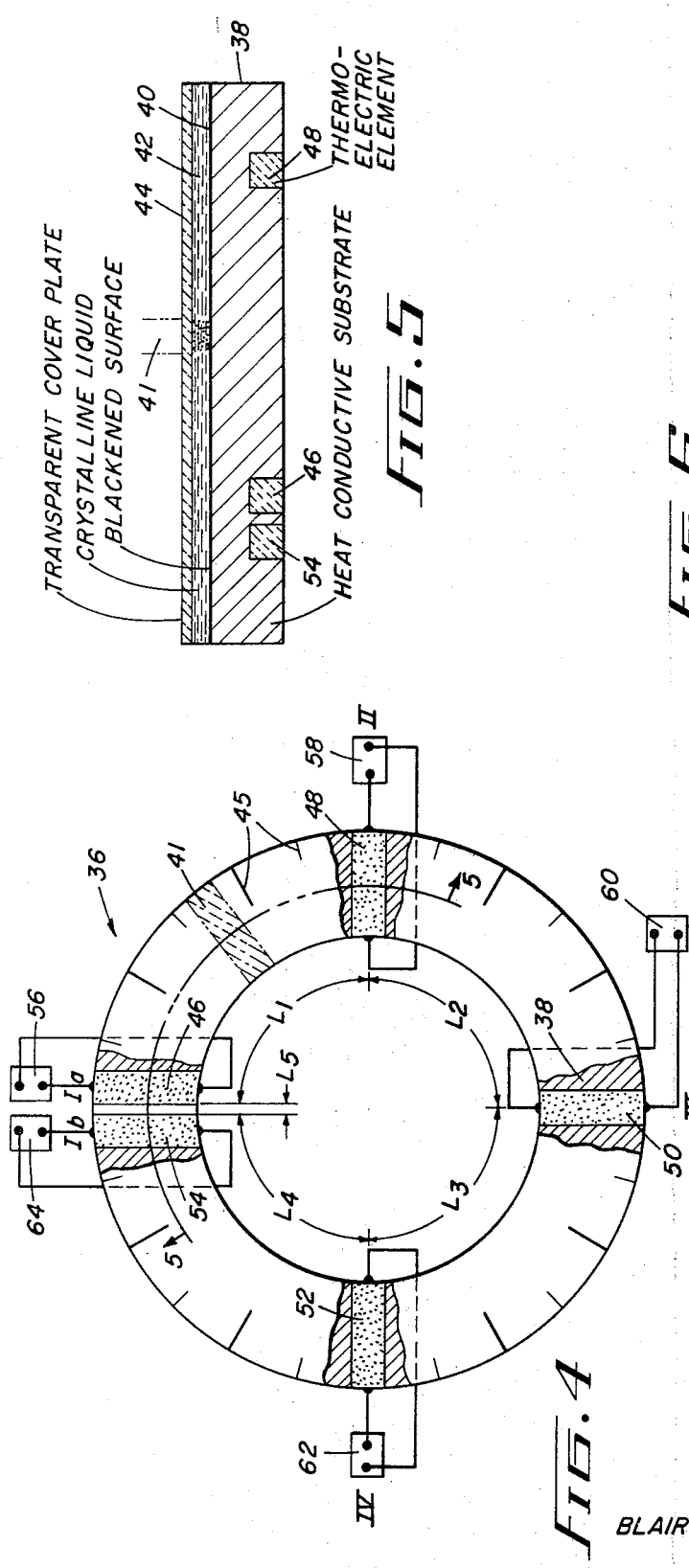
INVENTOR.
HEINZ de KOSTER
BY
BLAIR, BUCKLES, CESARI & ST. ONGE
ATTORNEYS Aug. 18, 1970     H. A. DE KOSTER     3,524,726

Filed April 4, 1968     3 Sheets-Sheet 3

COLORLESS

RED

GREEN

BLUE-VIOLET

COLORLESS

INVENTOR.
HEINZ de KOSTER

BY
BLAIR, BUCKLES, CESARI & ST. ONGE

ATTORNEYS

United States Patent Office 3,524,726
Patented Aug. 18, 1970

3,524,726
SMECTOGRAPHIC DISPLAY
Heinz A. de Koster, Stamford, Conn., assignor to General Time Corporation, Stamford, Conn., a corporation of Delaware
Filed Apr. 4, 1968, Ser. No. 718,823
Int. Cl. G02b 5/00; G02f 5/00
U.S. Cl. 23—253
16 Claims

ABSTRACT OF THE DISCLOSURE

Display device comprising a heat conductive substrate having a coating of crystalline liquid material which exhibits a colored smectic state when heated to a predetermined smectic temperature range. A temperature gradient in part encompassing the smectic temperature range is imposed on the crystalline liquid coating to produce therein a discrete, colored smectic band forming a display indicator. The temperature gradient may be produced by heating elements or thermoelectric elements spaced on the substrate; these are proportionally raised or lowered in temperature to cause the indicator to move. The display device may be linear or curvilinear in shape, and means are disclosed for producing a multi-revolution indicator on a circular device.

BACKGROUND OF THE INVENTION

So called "solid state" display devices have in recent years been the subject of great interest and research. These display devices which can be used in such diverse applications as clock faces, meters for electrical instrumentation and high speed computer readout devices, are particularly attractive due to the absence of moving parts and their relatively low electrical power requirements. These features of the solid state displays contribute to accuracy and quiet operation, and insure a relatively long and maintenance-free service life. In addition, their low power requirements make solid state display devices ideal for use in applications where electrical power supplies are by necessity weak, or where battery power is employed so that the apparatus containing the display device becomes portable.

One prior art display device has employed thermochromic materials which change color through chemical reaction upon application of heat. These prior art devices, while suitable for static displays, cannot be used for displays requiring a discrete, colored indicator line continuously movable over a surface. This makes thermochromic devices inappropriate for such applications as, for example, a display face for a continuous reading electrical instrument.

Accordingly, representative objects of the present invention are to provide a method and apparatus for achieving a solid state display having a discrete and continuously movable display indicator, which requires little power, and which is efficient and reliable in use.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

SUMMARY OF THE INVENTION

The present invention relates to a solid state display and the method for producing such a display; more particularly it relates to a smectographic display utilizing materials which exhibit a visually discernible smectic state when heated to within a predetermined temperature range.

Many materials when heated exhibit a transition state which occurs over a range of temperature. Within this temperature range the material undergoes a molecular change and oftentimes exhibits properties which differ from the properties of the material at higher or lower temperatures; the materials employed in the invention are of this category. They are colorless at most temperatures but exhibit visually discernible coloration in a relatively small temperature band.

The materials employed in the invention, which will be referred to herein in the specification and claims as crystalline liquids, are a group of organic materials which at low temperatures have a microstructure consisting of long molecular chains (FIG. 7). In this state they have much the consistency of petroleum jelly and are similarly essentially transparent in thin layers. Upon heating, however, the long molecular chains break up into shorter segments. Within a relatively narrow band of temperatures known as the smectic (colored) range, the molecules orient themselves in a diffraction grid-like pattern which causes the previously transparent crystalline liquid to become brightly colored. At the low temperature end of the smectic range the grid-like pattern is relatively widely spaced (FIG. 8), and through diffraction the light reflected therefrom appears red. As the temperature within the smectic range increases, the spacing of the grid-like pattern decreases and the diffracted light shifts toward green (FIG. 9) and then blue or violet (FIG. 10). The consistency of crystalline liquids in the smectic state remains similar to that of petroleum jelly. Upon exceeding the smectic temperature range, the oriented groups of molecules break up and the materials go to an amorphous state (FIG. 11); this, like the previously discussed low temperature state, is transparent and has the consistency of petroleum jelly.

The red to violet color band exhibited by crystalline liquids in the smectic state is highly visible, and since it derives from the diffraction of incident light, it becomes more visible as the incident light increases in intensity. Accordingly the smectic band is particularly visible in well lighted areas. It is the visually discernible smectic state of crystalline liquids which is employed in the method and apparatus of the invention.

Generally, a display device in accordance with the invention comprises a substrate of a heat conductive material upon which is applied a thin coating of a crystalline liquid material having a visually discernible smectic state. To activate the display, a temperature gradient which encompasses the smectic temperature range for the particular crystalline liquid is imposed on the substrate. The crystalline liquid on any portion of the substrate which is cooler or warmer than the smectic range remains transparent. However, where the substrate temperature is within the relatively narrow smectic range, a highly visible zone in the form of a band of color will appear in the crystalline liquid coating.

The position of the colored or smectic band on the substrate will depend upon the temperature distribution in the gradient imposed thereon. As is more fully described below, if the temperatures of the high and low ends of the gradient are simultaneously and proportionally increased or decreased, the smectic band will shift its position on the substrate by a determinable amount. In this manner the visible smectic band becomes an accurately controlled, movable indicator on the face of the display device.

The width of the smectic band can also be expanded or contracted as desired by respectively decreasing or increasing the slope of the temperature gradient imposed on the substrate. The leading edge of an expanding or contracting band may serve as a display indicator for some applications. As will be seen from the more specific discussion to follow, this may conveniently be accomplished by keeping the temperature at one extreme of the gradient constant while the temperature at the other extreme is raised or lowered to respectively contract or expand the indicator.

The display of the present invention can be linear or curvilinear in shape and may be used, for example, as the display dial for an electrical instrument, as the face of the clock, or in any application requiring a continuously movable, visually discernible indicator.

BRIEF DESCRIPTION OF THE DRAWINGS

For a fuller understanding of the nature and objects of the invention, reference should be had to the following detailed description taken in connection with the accompanying drawings, in which:

FIG. 1 is a front view of a linear smectographic display device in accordance with the invention.

FIG. 2 is a greatly enlarged sectional view taken along line 2—2 of FIG. 1.

FIG. 3 is a graphical representation of the operation of the device of FIG. 1.

FIG. 4 is a front view of a curvilinear smectographic display device, shown partly in section.

FIG. 5 is a greatly enlarged partial sectional view taken along line 5—5 of FIG. 4.

FIG. 6 is a graphical representation of the operation of the device of FIG. 4.

Similar reference characters refer to similar parts throughout the several views of the drawings.

DESCRIPTION OF THE PREFERRED EMBODIMENTS

Figure 7:
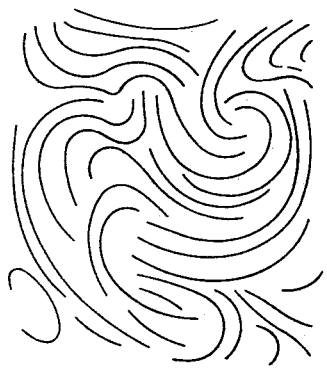
FIGS. 7 to 11 are pictorial representations of the molecular structure of crystalline liquids in various states.
Figure 8:
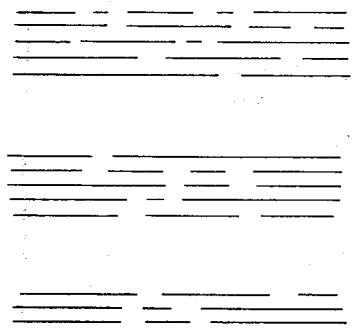
Figure 9:
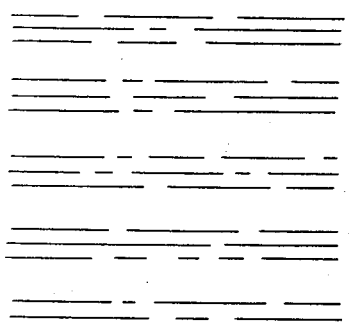
Figure 10:
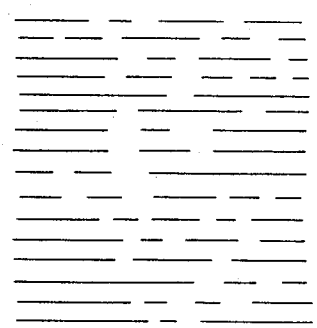
Figure 11:
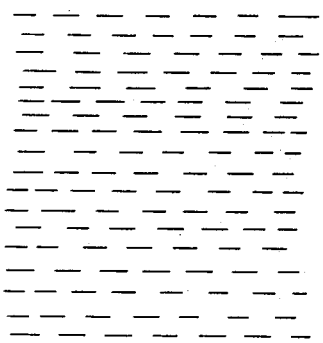

Referring now to FIG. 1, there is shown a linear smectographic display 20 such as might be used as the display dial of an electrical instrument. It comprises a substrate 22 (FIG. 2) formed of a good heat conducting material such as a metal like copper, silver or aluminum, or a highly thermal conductive glass or ceramic. Preferably, the visible surface 24 of substrate 22 is blackened by painting, anodizing or the like to provide visual contrast with the indicator of the display. Substrate 22 may be formed as a monolithic member; preferably, however, and particularly where size is a critical factor, it will be a layer which is applied by printed circuit, thick film, or thin film techniques to a backing member.

A thin coating 26 of crystalline liquid material is applied over the darkened surface 24 of substrate 22. Coating 26 in a typical application will be in the order of approximately 0.1 millimeter or 0.004 inch thick. The crystalline liquids which are used for the purposes of the invention comprise a group of organic chemical compounds which exhibit a visually discernible, colored smectic state. Tyical examples of such materials are thallium stearate, thallium oleate, cholesterine derivatives and certain unsaturated aliphatic carbonacides. A family of useful crystalline liquid materials of the cholesterol oleate variety are marketed by the Pressure Chemical Co. of Pittsburgh, Pa., and the commercial designations and smectic temperature ranges of these materials are set forth in the following table:

TABLE I

| Material designation: | Smectic temperature range, ° C. |
|---|---|
| LCX-96 | −7–0 |
| LCX-97 | −3–+1 |
| LCX-100 | 0–+4 |
| LCX-103 | 3–6 |
| LCX-106 | 6–9 |
| LCX-109 | 9–11 |
| LCX-112 | 12–15 |
| LCX-115 | 15–18 |
| LCX-117 | 17–20 |
| LC-120 | 20–23 |
| LC-124 | 24–27 |
| LC-127 | 27–30 |
| LC-130 | 30–33 |
| LC-134 | 34–37 |
| LC-137 | 37–40 |
| LC-140 | 40–43 |
| LC-145 | 45–48 |
| LC-150 | 50–53 |
| LC-155 | 55–58 |
| LC-160 | 60–64 |
| LC-164 | 64–68 |

A transparent cover plate 28 of glass, plastic or the like is preferably placed over the coating 26 of crystalline liquid to protect it from contamination, or damage from contact; the cover plate may further be extended to surround the display to prevent heat dissipation and conserve power. It has been found that the use of a cover plate also improves the visibility of the smectic band. Cover plate 28 may also conveniently be provided with indicia 29 appropriate to the particular application for which display 20 is intended.

The temperature gradient producing the colored smectic band which acts as the indicator of display 20 is produced by heating one end of substrate 22 relative to the other. This can be accomplished by contacting one or both of the ends with heated or cooled fluids, with exothermic or endothermic materials, or with an open flame or the like. However, when the display forms a part of an electrical instrument and accuracy is required, the heating or cooling is preferably accomplished electrically.

Referring back to FIG. 1, heat conductive tabs 22a, 22b are provided at each end of substrate 22. A heating element in the shape of a coil 30a, 30b is placed on or about each tab 22a, 22b, and each coil is connected to a variable current source 32a, 32b. Coils 30a and 30b may be formed of high resistance electrical wire, or may be applied on the tabs 22a and 22b by printed circuit or thin film techniques; where thin film is used, a strip may be substituted for the coil shaped elements shown in FIG. 1. The variable current sources 32a and 32b will, in the case of a display for an electrical instrument, be a part of or be controlled by the output circuitry of the instrument.

The operation of display 20 is best understood with reference to FIGS. 1, 2 and 3. Assume that the crystalline liquid coating 26 is material LC–164 from Table I having a smectic temperature range of 64 to 68° C. If heating coil 30a is heated to 50° C. and heating coil 30b is heated to 82° C., the temperature gradient shown graphically by line A in FIG. 3 will be imposed over the length L of substrate 22. Under these temperature conditions, the smectic range of 64 to 68° C. will exist as a narrow temperature band X at the center of display 20, as shown by projection in FIG. 3. Accordingly, the crystalline liquid coating 26 within band X will be in the smectic state and form a highly visible colored indicator 34 on display 20.

By proportionally raising or lowering the temperatures of both coils 30a and 30b, indicator 34 can also be moved over the length L of display 20 as shown in FIG. 3. For example, by gradually lowering the temperatures of both coils 30a and 30b by 14° C. to respectively 36° C. and 68° C., the temperature gradient becomes that shown by line B, and the smectic temperature range and thus indicator 34 is gradually shifted to band Y at the right end of display 20. Conversely, by raising the temperatures of each coil by 14° C. respectively, to 64° C. and 96° C. (gradient line C), indicator 34 can be shifted to band Z at the left end of display 20. Indicator 34 can, of course, be halted at any intermediate point between bands X, Y and Z by controlling the temperatures of coils 30a and 30b, and this control may be readily accomplished through connection with the output of an electrical instrument.

It can also be seen from FIG. 3 that the width of the smectic zone and therefore indicator 34 can be varied by varying the steepness of the temperature gradient; a steeper gradient produces a narrower indicator while a flatter gradient makes the indicator broader.

The smectographic display is not, however, limited to the linear type described above, and may be curvilinear in shape. Referring to FIG. 4, there is shown a circular smectographic display 36 which, like the linear display, can be used as the display dial for an electrical instrument, and which is particularly suitable for use as the face of a clock.

The basic structure of the circular display 36 is similar to the linear display described above and comprises a heat conductive substrate 38 (FIG. 5) preferably having a blackened surface 40 to contrast with the display indicator 41. As in the linear display substrate 38 may be monolithic or may be formed on a backing member by printed circuit, thick film or thin film techniques. Blackened surface 40 is provided with a coating of crystalline liquid 42 of the type described above. A protective, transparent cover plate 44 of glass or the like preferably covers coating 42 and may be extended to surround the display for heat insulating purposes. Cover plate 44 may also be provided with suitable indicia 45.

Due to the circular shape of display 36, a somewhat more complex means is preferably used to produce the temperature gradient required to generate an indicator which revolves continuously over the entire surface 40. Referring to FIG. 4, a plurality of thermoelectric elements 46, 48, 50, 52 and 54 are provided under substrate 38 (FIG. 5) and divide up the substrate essentially into quadrants L1, L2, L3 and L4; as will be shown, each quadrant functions in much the same manner as the linear display described above. Like substrate 38, thermoelectric elements 46, 48, 50, 52 and 54 may be either monolithic or may be produced on a backing member by printed circuit or thin film techniques. It will also be understood that the thermoelectric elements may be placed on or between the quadrants of substrate 38 rather than as shown.

Elements 46, 48, 50, 52 and 54 display a unique property common to thermoelectrics; when doped with impurities to form a p-n junction, they heat up when electrical current is passed through them in one direction and cool down when the current is reversed in polarity (Peltier effect). The degree of heating and cooling effected is dependent upon the magnitude of the current. Useful thermoelectric materials include, for example, PbTe, $Bi_2Te_3$, PbTe-PbSe, PbTe-SnTe and InSb. These thermoelectric materials may be doped with selected impurities to provide varying ranges of heating and cooling as desired.

As shown in FIG. 4, each thermoelectric element 46, 48, 50, 52 and 54 is respectively electrically connected to a current source 56, 58, 60, 62 and 64. These current sources are variable, that is, the strength of the current from the source may be varied in magnitude; they are also capable of reversing their polarity. The current sources for display 36 will typically form part of or be connected to the output circuitry of an electrical instrument such as, for example, an electronic clock.

The operation of display 36 can be seen with reference to FIGS. 4 and 6. FIG. 6 illustrates graphically the operation of display 36; the vertical axis represents the temperature at various points in display 36, and the horizontal axis represents positions around the face of display 36 presented in linear rather than curvilinear form for ease of explanation. The vertical lines labeled Ia, II, III, IV and Ib represent the positions of the thermoelectric elements on display 36 as read clockwise from the "twelve o'clock" position.

To begin, let us assume that the crystalline liquid layer is LC-164 having a smectic temperature range of 64 to 68° C. (Table I). For ease of explanation I will describe the function of display 36 with reference only to the midpoint of the smectic range, namely 66° C. If now sufficient current is fed from source 56 through thermoelectric element 46 in the proper direction to heat it to 66° C., while thermoelectric elements 48, 50, 52 and 54 are kept at a temperature outside the smectic range, a colored smectic band will appear over element 46 at position Ia. To provide a temperature gradient similar to that described with reference to the linear display, elements 48, 50, 52 and 54 should all initially have a temperature of either 36° C. or 96° C. produced therein by their respective power supplies; let us assume that the initial temperature is 36° C. as shown in FIG. 6. A temperature gradient (dotted line a) is then produced only between position Ia and position II.

If now current sources 56 and 58 are activated to heat elements 46 and 48 gradually and proportionally to respective temperatures of 96° C. and 66° C., gradient line a will move to the position of dotted line b and the colored smectic band or indicator will gradually move from position Ia to position II over quadrant I1 in the same manner as described for the linear display with reference to FIG. 3.

Still referring to FIG. 6, since position III has been maintained at a temperature of 36° C., when point II is raised in temperature to 66° C. a new temperature gradient is produced between points II and III, as represented by dotted line c. If now while maintaining position Ia at a temperature of 96° C., positions II and III are gradually and proportionally raised in temperature respectively to 96° C. and 66° C., gradient c gradually moves to the position of dotted line d and indicator 43 gradually moves from position II to position III over quadrant L2. The same process may then be repeated to move the indicator between points III and IV over quadrant L3, and between points IV and Ib over quadrant L4. Indicator 42 is thus driven clockwise around the face of display 36 by gradually and proportionally raising and maintaining the temperatures of adjacent pairs of thermoelectric elements in a steady progression in a clockwise directon.

For most electrcal instruments a display 36 as described to this point will function satisfactorily, since upon reaching position Ib at the end of a single revolution there is no need for the indicator to cross over to point Ia to begin a second revolution. The above described process may simply be reversed by gradually diminishing the current, or by reversing the polarity of the current sources as the case may be to lower the temperatures of the thermoelectric elements; this will drive the indicator backwards in a counterclockwise direction respectively between positions Ib, IV, III, II and Ia.

In some applications, however, notably when display 36 is to be used as a clock face, it is desirable to have indicator 43 continue in a clockwise direction between positions Ia and Ib and into a second revolution. This is accomplished as follows: referring to FIG. 6 in the portion labeled "Second Revolution of Indicator," when the smectic band or indicator 43 reaches position Ib, there is a temperature gradient as represented by dotted line i created between positions Ib and Ia (position Ia as well as positions II, III and IV remain at 96° C. from the process of the first revolution). If now current source 64 (FIG. 4) is activated to substantially instantaneously raise the temperature of position Ib to 96° C. while current source 56 is simultaneously activated to substantially instantaneously lower the temperature of position Ia to 66° C., a new reversed temperature gradient represented by dashed line j is created. The substantially instantaneous temperature changes can be conveniently produced by switching the polarity of thermoelectric elements 46 and 54. Since in switching from gradient i to gradient j there is no intermediate gradient produced which crosses 66° C., the indicator will "jump" in a discontinuous manner between positions Ib and Ia over segment L5 (FIGS. 4 and 6). For this reason elements 54 and 46 should be positioned as close together as is possible without causing a short circuit to make the jump of indicator 43 relatively inconspicuous.

Once the jump described above has been accomplished, a temperature gradient as represented by dashed line k is produced between positions Ia and II. If current sources 56 and 58 are activated to lower the temperatures of elements 46 and 48 at positions Ia and II, the gradient may be gradually lowered to dashed line position l (FIG. 6), and the indicator is thus again driven over quadrant L1 in a clockwise direction. This process may then be repeated respectively between positions II, III, IV and Ib as shown by dashed gradient lines m, n, o. p, q and r. A second but reversed "jump" is then effected between positions Ib and Ia (from dashed gradient line s to dotted line t) to begin another revolution. As shown by FIG. 6, the second reversed "jump" recreates the conditions obtaining at the beginning of the first revolution and so the process continues ad infinitum as desired.

While display 36 has been described with 5 thermoelectric elements arrayed in quadrants, more or less may be used in a variety of patterns which will suggest themselves to those skilled in the art.

It will also be noted that while the use of thermoelectric elements is particularly advantageous in a curvilinear display device, such elements may be substituted for the heating elements in a linear smectographic display. Thermoelectric elements are particularly useful in linear displays of extended length which require a plurality of heating elements at spaced intervals for efficient operation. Conversely, heating elements of the type disclosed in conjunction with the linear display may be employed in those curvilinear displays which do not require the indicator to "jump" from a first revolution into a second revolution. Heating elements, when used on such a curvilinear display, may merely be allowed to cool to reverse the direction of the display indicator.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A smectographic display device comprising, in combination:
   (A) a substrate,
   (B) a coating on said substrate of crystalline liquid having a visually discernible smectic state, and
   (C) means for imposing a controllable temperature gradient on said coating,
      said temperature gradient in part encompassing the smectic temperature range of said crystalline liquid whereby a discrete and controllable smectic zone forming a display indicator is produced in said coating.

2. A smectographic display device as defined in claim 1 and further including means for changing the temperature of at least one end of said gradient to cause said display indicator to change its position in said crystalline liquid coating.

3. A smectographic display device as defined in claim 1 and further including a blackened surface on said substrate under said crystalline liquid coating for increasing the visibility of said display indicator.

4. A smectographic display device as define din claim 1 and further including a transparent, protective cover plate over said coating of crystalline liquid.

5. A smectographic display device as defined in claim 1 including indicia for relating the position of said indicator to a physically measurable variable.

6. A smectographic display device comprising, in combination:
   (A) a heat conductive substrate,
   (B) a coating on said substrate of crystalline liquid having a visually discernible smectic state,
   (c) heating means for controllably heating a first portion of said substrate relative to a second portion spaced therefrom to produce a temperature gradient in said crystalline liquid coating,
      said temperature gradient in part encompassing the smectic temperature range of said crystalline liquid whereby a discrete smectic zone forming a display indicator is produced in said coating, and
   (D) means for raising or lowering the temperature of said heating means in a manner to substantially simultaneously and proportionally raise or lower the temperatures of said first and second portions of said substrate and cause said display indicator to change its position in said crystalline liquid coating.

7. A smectographic display device as defined in claim 6 wherein said heating means comprises at least one pair of electrical heating elements positioned at spaced points adjacent said substrate and each in heat conductive relation with one of said substrate portions.

8. A smectographic display device as defined in claim 6 including a plurality of successive portions on said substrate serially heated by said heating means to produce a progression of temperature gradients, and means for serially changing the temperature gradient between said successive portions to cause said display indicator to move on said display device.

9. A smectographic display device comprising, in combination:
   (A) a heat conductive substrate,
   (B) a coating of crystalline liquid on said substrate, said crystalline liquid having a visually discernible smectic stage,
   (C) a plurality of thermoelectric elements positioned at spaced intervals adjacent to said substrate and in heat conductive relation therewith, and
   (D) means for progressively passing an electric current of adjacent thermoelectric elements
      to serially create a temperature gradient in the crystalline liquid coating between said successive pairs which in part encompasses the smectic temperature range of said coating, whereby a discrete and visually discernible display indicator is serially displayed between said successive pairs, and
      to proportionally and substantially simultaneously change the temperatures of each said successive pairs in seriatim to change said gradient and cause said indicator to move over the surface of said display device.

10. A smectographic display device as defined in claim 9 wherein said means are capable of reversing the polarity of said electric currents through said thermoelectric elements to change the temperatures thereof.

11. A smectographic display as defined in claim 9 having a closed curvilinear shape and wherein at least one pair of said thermoelectric elements are closely spaced, and further including means for substantially simultaneously and instantaneously reversing the temperature gradient between said pair of closely spaced thermoelectric elements whereby said display indicator can progress from a first revolution of said curvilinear display into succeeding revolutions thereof with minimal noticeable discontinuity.

12. A method for producing a smectographic display comprising, in combination, the steps of:
  (A) providing a substrate with a coating of crystalline liquid having a visually discernible smectic state, and
  (B) imposing a controllable temperature gradient in said coating which in part encompasses the smectic temperature range of said crystalline liquid to produce a discrete and controllable smectic zone forming a display indicator in said coating.

13. A method as defined in claim 12 and further including the step of raising or lowering the temperature of at least one end of said gradient to cause said display indicator to change its position in said coating.

14. A method as defined in claim 13 wherein the temperatures at each end of said gradient are gradually and proportionally raised or lowered to produce a display indicator of substantially constant width.

15. A method as defined in claim 12 including the steps of serially imposing a plurality of said temperature gradients each in successive portions of said coating, and serially and proportionally raising or lowering the temperatures at each end of said successive gradients to cause said display indicator to progress through said successive portions of said coating.

16. A method as defined in claim 15 wherein said display is of a closed curvilinear shape and including the shape of substantially instantaneously reversing the next succeeding temperature gradient when said display indicator has completed one revolution of said display to cause said display indicator to progress to a succeeding revolution thereof.

References Cited

UNITED STATES PATENTS 3,322,485    5/1967    Williams _____ 340—324
3,415,991    12/1968    Asars.

MORRIS O. WOLK, Primary Examiner

R. M. REESE, Assistant Examiner

U.S. Cl. X. R.

23—230; 40—28; 73—339, 356; 116—100; 340—324; 350—160